Sept. 20, 1927.  H. EIS  1,643,240
LINE DRIVE AND CLUTCH CONTROL
Filed Dec. 31, 1926   3 Sheets-Sheet 1

Harry Eis, INVENTOR
BY Victor J. Evans
ATTORNEY

WITNESS:

Sept. 20, 1927.　　　　　　　　　　　　　　　　　1,643,240
H. EIS
LINE DRIVE AND CLUTCH CONTROL
Filed Dec. 31, 1926　　　　　3 Sheets-Sheet 2

Harry Eis, INVENTOR

Sept. 20, 1927. 1,643,240
H. EIS
LINE DRIVE AND CLUTCH CONTROL
Filed Dec. 31, 1926   3 Sheets-Sheet 3
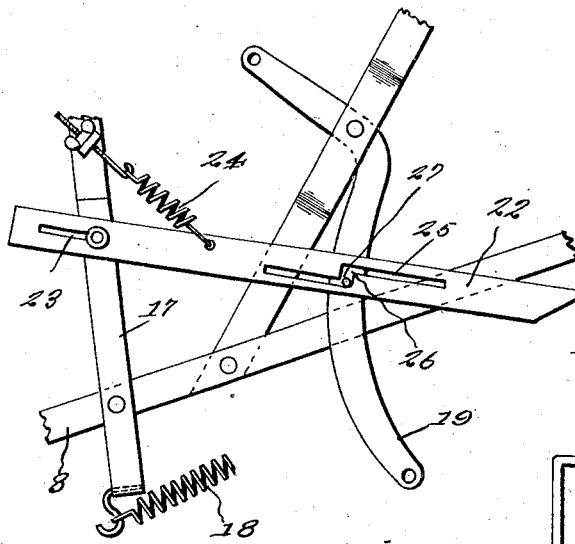
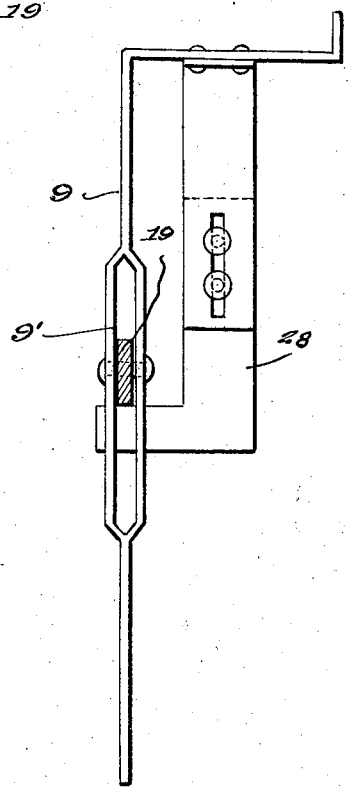
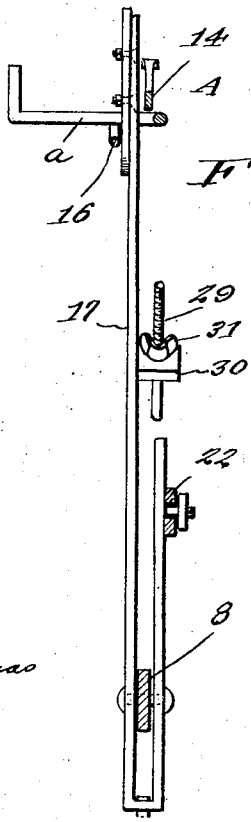
Harry Eis, INVENTOR
BY Victor J. Evans
ATTORNEY Patented Sept. 20, 1927.

1,643,240

UNITED STATES PATENT OFFICE.

HARRY EIS, OF HOLGATE, OHIO.

LINE DRIVE AND CLUTCH CONTROL.

Application filed December 31, 1926. Serial No. 158,303.

This invention relates to an attachment for the Ford type of tractor, the general object of the invention being to provide means whereby the tractor can be driven from an implement being pulled by the tractor so that one man can operate both the tractor and the implement, thus eliminating an operator for the tractor.

A further object of the invention is to provide means whereby the clutch of the tractor can be permitted to take hold gradually, the same as if it was being operated by the foot of an operator.

A still further object of the invention is to so arrange the clutch operating means that the clutch can be moved to operative or inoperative position by a single rope or cable leading to the implement, a double line being used to steer the tractor.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 5 is a view of portions of the invention looking toward the inner side of such portions.

Figure 6 is a section on line 6—6 of Figure 4.

Figure 7 is a section on line 7—7 of Figure 4.

Figure 1:
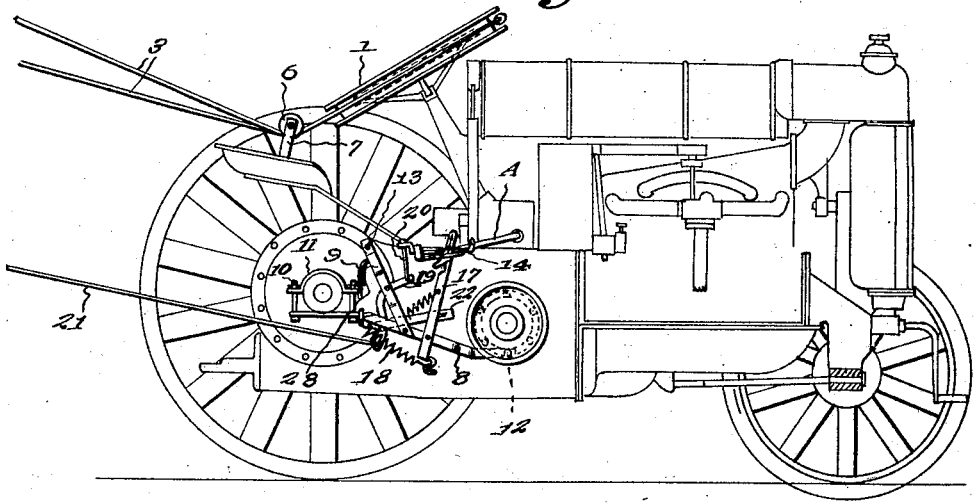
Figure 1 is a side view with parts omitted, showing the invention applied to a tractor.
Figure 2:
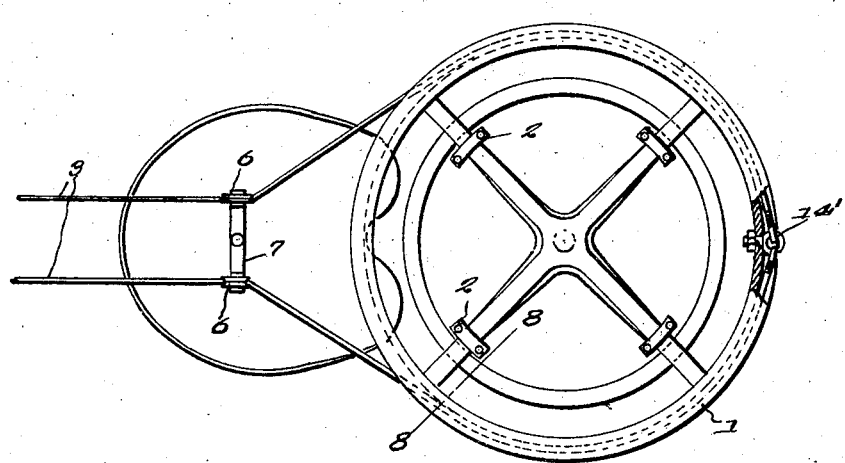
Figure 2 is a plan view showing the means for steering the tractor.
Figure 8:
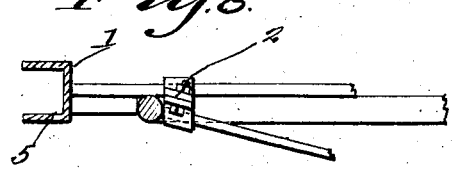
Figure 8 is a section on line 8—8 of Figure 2.

The means for steering the tractor comprises a pulley-like wheel 1 which has its spokes clamped to the spokes of the steering wheel of the tractor by the clamps 2 and the lines 3 which are fastened to the front of the wheel by the eye bolt 14' and after passing around the periphery of the wheel, the lines pass over the small pulleys 6 which are fastened to the seat of the tractor by the bracket 7. The lines then pass to the implement where they can be grasped by the operator occupying the seat of the said implement. Thus by pulling upon one line 3, the steering wheel will be turned to the left to make the tractor turn to the left and by pulling upon the other line 3, the tractor will be guided to the right.

A frame, comprising a bar 8 and a bar 9, is fastened to the clutch side of the tractor by the bar 8 being clamped to the rear axle housing by the bolts 10 and the semi-circular clamp part 11, with the other end of the bar 8 held in place by one of the bolts 12 of the cover plate of the pulley shaft of the tractor, with the bar 9 fastened to the bar 8 and its other end held in place by one of the bolts 13 of the differential housing of the tractor. A bar 14 has a clamp 15 at one end thereof which engages the shank of the clutch pedal A and this bar passes over the foot part $a$ of the pedal and has an upwardly offset end which is located beyond the foot part of the pedal, but this bar is so positioned that it will not interfere with the engagement of the foot pedal by the foot of an operator occupying the seat of the tractor. A guide bar 16 has one end fastened to the foot part A of a foot pedal and its other end is fastened to the bar 14, these two parts forming a guideway for a latch lever 17 which is pivoted to the bar 8 of the frame and has its upper end passing between the bars 14 and 16. The latch part of this lever 17 is adapted to engage the foot part of the clutch pedal to hold the same in depressed condition. A spring 18 has one end connected with the lower end of the latch lever 17 and its other end is attached to a part of the frame and tends to hold the latch lever in inoperative position. A lever 19 is pivoted to the bar 9 of the frame by passing through a yoke-shaped part 9' of the frame to which it is pivoted and the upper end of this lever 19 is connected by a link 20 with the offset end of the rod 14. A cable or line 21 is connected with the lower end of the lever 19 and leads to the implement being pulled by the tractor. A trip bar 22 is movably connected with the lever 17 by the slot and pin connection 23. A spring 24 connects this bar 22 with the lever 17 and the said bar 22 has a slot 25 therein which is provided with a central vertical portion forming a shoulder 26 and a pin 27, carried by the lever 19, passes through said slot. An L-shaped stop arm 28 is fastened to the horizontal upper part of the bar 9 and curves downwardly to a point above the beveled rear end of the trip bar 22 and acts as a trip for the said bar.

Figure 3:
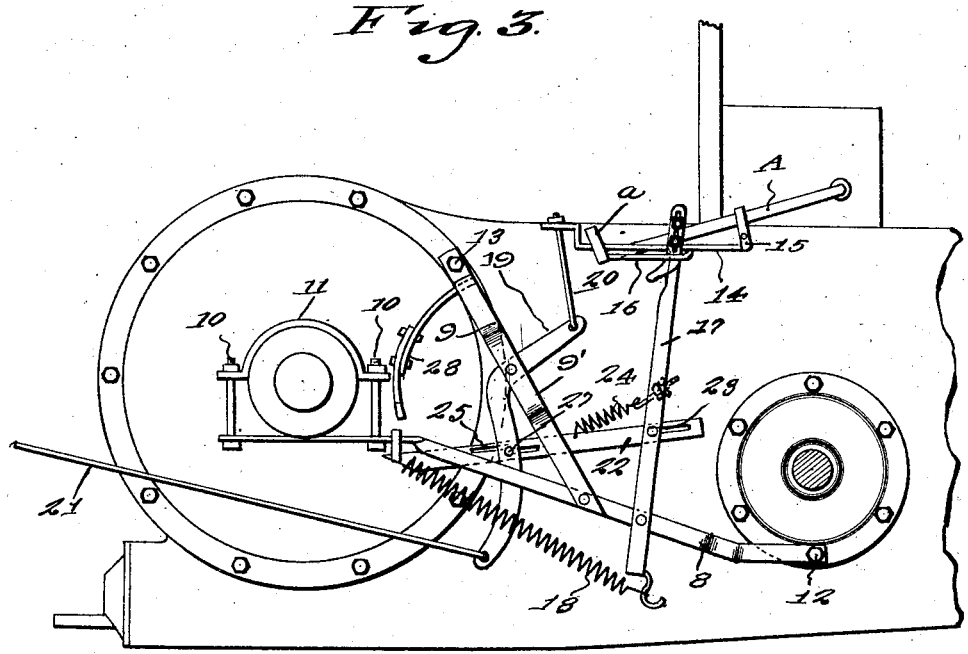
Figure 3 is an enlarged elevation of the clutch operating means applied to the tractor.
Figure 4:
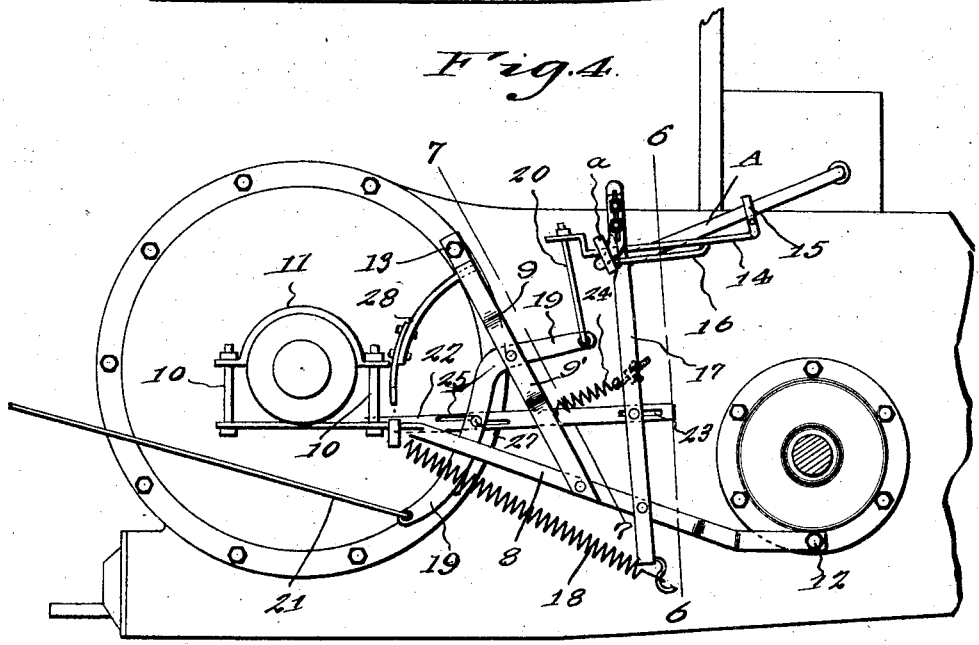
Figure 4 is a similar view but showing the parts with the clutch in inoperative position.

With the parts in the position shown in Figures 1 and 3, the clutch will be in operative position and the tractor will be in motion if the motor is in operation. When the operator on the implement being pulled by the tractor wishes to stop the tractor, he will pull upon the line 21, thus rocking the lever 19 on the bar 9 of the frame so that the bar 14 is pulled downwardly through means of the link 20 carrying the clutch pedal with it, so that the said pedal is moved into inoperative position. This rocking movement of the lever 19 will also cause the bar 22 to move toward the rear of the tractor, due to the fact that the pin 27 of the lever 19 is engaging the shoulder 26 so that the said bar must move with the lever. This movement of the bar 22 will tension the spring 24 and and thus the said spring will move the latch lever 17 over against the foot part of the foot pedal so that it will hold the pedal in lowered position. Thus the clutch will be in inoperative position and the tractor will come to rest. The line 21 can then be slacked, as the latch lever will hold the clutch pedal in depressed condition. When the clutch is to be engaged again, the line 21 is pulled upon and this action will lower the pedal A so that it will pass out of the notch of the latch lever and this further movement of the lever 19 will carry the trip bar 22 to a position where it will strike the trip member 28, which will force it downwardly so that the pin 27 will be disengaged from the shoulder 26 and will pass into the rear part of the slot 25 so that the spring 24 will move the bar 22 forwardly and will permit the spring 18 to move the latch lever away from the foot pedal. Then by gradually slackening the line 21, the clutch can be permitted to slowly move into gripping position. As the parts return to normal position the pin 27 will again engage the shoulder 26 so as to be ready for the next operation.

Thus it will be seen that I have provided means whereby the tractor can be operated and steered by an operator on an implement being pulled by the tractor with but three lines. As shown in Figure 6, I prefer to form the lower part of the latch lever 17 of U-shape so that it will embrace the bar 8 and I also provide means for adjusting the tension of the spring 24 through means of the hook-shaped bolt 29 and which is carried by a projection 30 on the lever 17 and has its hooked end engaging one end of the spring 24. This bolt is adjusted by the wing nut 31.

In order to provide means whereby the device can be adjusted to fit different machines, I make the latch part 17' of the latch lever 17 adjustable by fastening it to the top of the lever by bolts which pass through slots in the two parts, the latch part 17' having slots therein through which the bolts pass. I also place an adjustable plate 28' on the stop arm 28 which has a bolt and slot connection to said arm so as to make the arm adjustable as to its length. Thus the device can be easily adjusted.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An attachment for a tractor comprising a frame adapted to be fastened to the tractor, a latch lever pivoted to the frame and having a latch part for engaging the clutch pedal to hold the same depressed, guiding means for the latch lever attached to the clutch pedal, a lever pivoted to the frame, and connected with the guiding means for lowering the pedal, a spring actuated member movably connected with the two levers for causing the latch lever to be moved into latching position by the operation of the other lever, a spring for moving the latch lever into inoperative position and a trip member for engaging the spring actuated member when the operating lever is moved while the pedal is depressed to release the spring actuated member so that the latch lever can be moved to releasing position by its spring.

2. An attachment for a tractor comprising a frame adapted to be fastened to part of a tractor, a latch lever pivoted to the frame and adapted to hold the clutch pedal depressed, a spring for holding the latch lever in releasing position, guiding means for the latch lever attached to the clutch pedal, an operating lever pivoted to the frame and connected with the guiding means, such guiding means depressing the pedal when the operating lever is actuated, a trip bar having a pin and slot connection with the latch lever, a spring connecting the bar with the latch lever, a slot in the trip bar having a vertical part forming a shoulder, a pin carried by the operating lever and engaging the shoulder and a trip arm connected with the frame and adapted to limit the upward movement of the trip bar to release the same from the operating lever when the operating lever is moved with the clutch pedal depressed and a cable connected with the operating lever for operating the same from a distance.

In testimony whereof I affix my signature.

HARRY EIS.